Patented Mar. 8, 1932

1,848,295

UNITED STATES PATENT OFFICE

WLADIMIR NIKOLAJEWITCH IPATIEW, OF BERLIN-WILMERSDORF, GERMANY, ASSIGNOR TO BAYERISCHE STICKSTOFFWERKE A.-G., OF BERLIN, GERMANY

PROCESS FOR PRODUCTION OF PHOSPHORIC ACID AND HYDROGEN

No Drawing. Application filed February 28, 1929, Serial No. 343,572, and in Germany March 24, 1928.

The oxidation of phosphorus with the aid of steam to phosphoric acid and hydrogen involves practical difficulties, which hitherto have not been overcome, and which are mainly due to the fact that the apparatus is built of materials which do not resist permanently the action of the phosphorus at the high temperatures applied, and that these temperatures cannot be sufficiently lowered even when catalysts are used.

It is known that, already at temperatures below 600° C. elementary phosphorus when elevated pressure is used reacts with water. In this case there are however produced, besides phosphoric acid and phosphorous acid, considerable quantities of phosphoretted hydrogen, so that this process was also not practical.

It has now been found that it is possible to convert phosphorus into phosphoric acids without losses, by the formation of phosphoretted hydrogen of phosphorus in a non-utilizable form. This process consists in that at temperatures below 600° C. and under increased pressures (up to 600 atm.) phosphorus is treated with water and, even after the complete disappearing of the phosphorus, the reaction is not interrupted, but the reaction pressure and temperatures are maintained for a longer time. In this manner there is a complete conversion of the phosphoretted hydrogen with the formation of phosphoric acid. After the completion of, or together with a primary reaction, in which the phosphorus is oxidized with water under pressure for one half to phosphoric acid and for the other half is reduced to phosphoretted hydrogen after according to the equation:

(1) $P_4 + 8H_2O = 2H_3PO_4 + 2PH_3 + 2H_2$ a second reaction occurs which proceeds more slowly and in which the phosphoretted hydrogen is in its turn oxidized to phosphoric acid according to the equation:

(2) $PH_3 + 4H_2O = H_3PO_4 + 4H_2$

As by reaction—or intermediate reaction a further conversion takes place according to the equation:

(3) $P_4 + 6H_2 = 4PH_3$

In order to suppress the formation of the phosphoretted hydrogen it is advantageous to avoid certain materials, as for instance iron, as walls of the vessels and to make the walls of the reaction spaces of the catalytically acting metals mentioned below, for instance silver. The completion of the reaction is not measured as hitherto by the disappearance of the phosphorus but ascertained by analysis of the hydrogen as to its percentage of phosphoretted hydrogen.

According to this process phosphoric acid is therefore obtained in a concentration which is dependent only upon the quantity of water which has been used. Pure hydrogen under pressure is further obtained which is adapted, especially when this pressure is being maintained, for subsequent use for pressure syntheses such as the production of methanol or ammonia.

If the process is carried through noncontinuous, a specific method of carrying out this invention is characterized in that phosphorus with a quantity of water calculated according to the desired acid concentration is brought into an autoclave and heated to the reaction temperature. An increased pressure will then be produced which, in the course of the reaction, increases more and more; the completion of the reaction can be ascertained by the pressure ceasing to increase any further, in case the process is carried out below the critical temperature of the water, as this cease of the pressure increase indicates that the reaction (2) above, which proceeds with an increase in the number of the gas molecules, is completed. To avoid an unduly slow progress of the reaction it may be advisable to introduce the components in the finest possible distribution and to make provision for a continuous or periodical intermixing of the reaction components. Also at higher temperatures the end of the reaction is indicated by the pressure remaining constant, provided the process is carried through in a closed apparatus.

If only a small amount of the reacting materials is employed for a comparatively large reaction space the pressure may be increased by addition of a suitable gas or of water in excess, or decreased by withdrawing gases at suitable intervals during the reaction. The continuous operation offers a special advantage in that the reaction components may be introduced into the hot reaction vessel continuously, or periodically either under pressure or with the pressure being completely or partially released. By an appropriate adjustment of the quantities of the reacting materials it is also possible to influence the pressure and to thereby control the course and speed of the reaction.

The time required for the completion of the reaction, which depends mainly on the speed of reaction (2) above, is essential for economically carrying out the process. It is therefore important to catalytically accelerate not only the primary reaction, but also the said secondary reaction. Effective catalysts are mainly precious metals, metallic phosphides, metallic phosphates or other phosphorus compounds, and especially those which may be formed by suitably conducting the process by reaction with added catalytic substances or with the walls of the vessel and which are insoluble in the reaction products. It is often advisable to make the wall of the reaction space of a catalytic substance or to provide in the same a coating of one or several of the substances mentioned. It is then possible to obtain without further precautions the separated acids in a form free from any catalytic substance. The reaction vessel may for instance inside be lined with a silver-plated copper layer so that the copper is exposed at certain points (for instance by scraping off the silver coating or the like). At first $Cu_3P_2$ will then be produced, the Ag remaining unattacked. As a result thereof catalyst-combination $Cu_3P_2$-Ag is formed on the wall of the vessel. Instead of $Cu_3P_2$ phosphides of other metals can be produced in a similar manner or metaphosphates can be produced by treatment with phosphoric acid. Other precious metals or alloys (monelmetal) can be substituted for the Ag. As will be shown more fully hereinafter in Example No. 1 it is possible in this manner to oxidize phosphorus almost quantitatively to phosphoric acid of any concentration according to the gross equation:

$$P_4 + 10H_2O = 2P_2O_5 + 10H_2$$

The hydrogen is, if the reaction period is sufficiently long, so pure that phosphoretted hydrogen cannot be detected even by the smell. It may however sometimes be more practical to remove the last traces according to another process.

It has further been ascertained that the net reaction is favorably influenced to a very large extent by the presence of bases, for which purpose use may be made for example of the hydroxides of the alkali metals or alkaline earth metals. Preferably such bases will of course be used, which are not objectionable in the reaction product.

*Example No. 1*

Phosphorus (1 part by weight) and water (3 parts by weight) were heated to 300° C. in a closed autoclave, which was lined with silver. After the pressure had become constant (about 120 atms.) a longer time, the autoclave was allowed to cool. In the autoclave there was, after cooling, still a pressure of 56 atmospheres above atmospheric pressure, caused by the hydrogen formed in the reaction. The analysis of the contents of the autoclave revealed 99.9% of the calculated quantity of hydrogen with only traces of phosphoretted hydrogen and 100% of the phosphorus used in the form of an acid capable of being titrated with alkali, in the form of a thick oily liquid.

*Example No. 2*

Phosphorus (1 part by weight) and water (10 parts by weight) were heated as described in Example 1 but in an autoclave lined with phosphide of copper. 98% of the phosphorus was obtained in the form of diluted acids and almost perfectly pure hydrogen in the calculated quantity was formed in addition thereto.

A special form of carrying out the process is characterized in that after termination of the primary reaction the waste gases are treated separated from the liquid medium, eventually under other conditions as the liquid constituents in accordance with the above described process.

Claims:—

1. The process of producing phosphoric acid and hydrogen which comprises maintaining phosphorus and water at an increased temperature below 600° C. and under a high pressure not exceeding 600 atmospheres for a time sufficient to effect substantially complete interaction of the phosphoretted hydrogen first formed with the water, thereby producing phosphoric acid and substantially pure hydrogen.

2. The process of producing phosphoric acid and hydrogen which comprises maintaining phosphorus and water at an increased temperature below 600° C. and under a high pressure not exceeding 600 atmospheres in a closed reaction space, until no further increase of the pressure occurs, thereby producing phosphoric acid and substantially pure hydrogen.

3. The process of producing phosphoric acid and hydrogen which comprises maintaining phosphorus and water at an increased temperature below 600° C. and under a high pressure not exceeding 600 atmospheres in a closed reaction space confined by silver, until no further increase of the pressure occurs, thereby producing phosphoric acid and substantially pure hydrogen.

4. The process of producing phosphoric acid and hydrogen which comprises maintaining phosphorus and water at an increased temperature below 600° C. and under a high pressure not exceeding 600 atmospheres for a time sufficient to effect substantially complete interaction of the phosphoretted hydrogen first formed with the water, the amount of water present being so calculated with reference to the phosphorus as to yield a phosphoric acid of the desired concentration, thereby producing phosphoric acid and substantially pure hydrogen.

5. The process of producing phosphoric acid and hydrogen which comprises maintaining phosphorus and water at an increased temperature below 600° C. and under a high pressure not exceeding 600 atmospheres in the presence of a precious metal for a time sufficient to effect substantially complete interaction of the phosphoretted hydrogen first formed with the water, thereby producing phosphoric acid and substantially pure hydrogen.

6. The process of producing phosphoric acid and hydrogen which comprises maintaining phosphorus and water at an increased temperature below 600° C. and under a high pressure not exceeding 600 atmospheres in the presence of a metal phosphorus compound for a time sufficient to effect substantially complete interaction of the phosphoretted hydrogen first formed with the water, thereby producing phosphoric acid and substantially pure hydrogen.

7. The process of producing phosphoric acid and hydrogen which comprises maintaining phosphorus and water at an increased temperature below 600° C. and under a high pressure not exceeding 600 atmospheres in the present of a metallic phosphide, for a time sufficient to effect substantially complete interaction of the phosphoretted hydrogen first formed with the water, thereby producing phosphoric acid and substantially pure hydrogen.

8. The process of producing phosphoric acid and hydrogen which comprises maintaining phosphorus and water at an increased temperature below 600° C. and under a high pressure not exceeding 600 atmospheres in the presence of copper phosphide for a time sufficient to effect substantially complete interaction of the phosphoretted hydrogen first formed with the water, thereby producing phosphoric acid and substantially pure hydrogen.

9. The process of producing phosphoric acid and hydrogen, which comprises maintaining phosphorus and water at an increased temperature below 600° C. and under a high pressure not exceeding 600 atmospheres in the presence of silver for a time sufficient to effect substantially complete interaction of the phosphoretted hydrogen first formed with the water, thereby producing phosphoric acid and substantially pure hydrogen.

10. The process of producing phosphoric acid and hydrogen which comprises maintaining phosphorus and water at an increased temperature below 600° C. and under a high pressure not exceeding 600 atmospheres in the presence of copper phosphide in a closed reaction space confined by silver, until no further increase of the pressure occurs, thereby producing phosphoric acid and substantially pure hydrogen.

In testimony whereof I affix my signature.

WLADIMIR NIKOLAJEWITCH IPATIEW.